United States Patent
Harrison

(10) Patent No.: US 12,091,162 B2
(45) Date of Patent: Sep. 17, 2024

(54) BRAKING UNIT

(71) Applicant: Goodrich Actuation Systems Limited, Solihull (GB)

(72) Inventor: Colin R. Harrison, Wolverhampton (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 119 days.

(21) Appl. No.: 17/738,090

(22) Filed: May 6, 2022

(65) Prior Publication Data

US 2022/0396352 A1   Dec. 15, 2022

(30) Foreign Application Priority Data

Jun. 14, 2021   (EP) ..................................... 21275079

(51) Int. Cl.
*B64C 25/46* (2006.01)
*B60T 8/17* (2006.01)

(52) U.S. Cl.
CPC ............ *B64C 25/46* (2013.01); *B60T 8/1703* (2013.01); *B60T 2270/402* (2013.01)

(58) Field of Classification Search
CPC .................. B64C 25/46; B60T 8/1703; B60T 2270/402

See application file for complete search history.

(56) References Cited

U.S. PATENT DOCUMENTS

| | | | |
|---|---|---|---|
| 7,556,224 B2 * | 7/2009 | Johnson | .................. B64C 13/50 244/175 |
| 10,401,875 B2 | 9/2019 | Matsui | |
| 10,422,659 B2 | 9/2019 | Smith | |
| 2013/0009017 A1 * | 1/2013 | Thompson | ............ B64C 13/505 244/213 |
| 2018/0346104 A1 | 12/2018 | Durkee | |
| 2020/0156766 A1 | 5/2020 | Tzabari | |

OTHER PUBLICATIONS

European Search Report for Application No. 21275079.8, mailed Dec. 3, 2021, 10 pages.
European Official Letter for Application No. 21275079.8, mailed Mar. 26, 2024, 7 pages.

* cited by examiner

*Primary Examiner* — Justin M Benedik
(74) *Attorney, Agent, or Firm* — CANTOR COLBURN LLP

(57) ABSTRACT

A braking unit includes a braking means and means, configured to receive power from a power line, for engaging and disengaging the braking means. A first power signal line is provided that is connected to the means for engaging and disengaging said braking means and a second power signal line is also provided that is connected to said means for engaging and disengaging said braking means. The first power signal line is connected to the means for engaging and disengaging the braking means via a first power switching device and the second power signal line is connected to the means for engaging and disengaging the braking means via a second power switching device.

14 Claims, 2 Drawing Sheets

BRAKING UNIT

CROSS REFERENCE TO RELATED APPLICATIONS

This application claims priority to European Patent Application No. 21275079.8 filed Jun. 14, 2021, the entire contents of which is incorporated herein by reference.

FIELD OF TECHNOLOGY

The examples described herein relate to braking units such as those that may be used in aircraft.

BACKGROUND

High lift actuation systems are used in aircraft for actuating a plurality of high lift surfaces such as slats. The high lift actuation systems may be powered by a power drive unit (PDU). In such systems a stopping device may be provided that is located at a location remote from the main power drive unit to provide an method of stopping the whole or part of the system in event of a failure.

Usually this brake is controlled/powered by an electronic controller unit (ECU) that controls or monitors the system status. The brakes activation device is typically some type of electric solenoid whether it be a solenoid hydraulic valve device or a mechanical solenoid.

SUMMARY

A braking unit is described herein comprising a braking means; means (configured to receive power from a power line) for engaging and disengaging said braking means; a first power signal line connected to said means for engaging and disengaging said braking means; a second power signal line connected to said means for engaging and disengaging said braking means; and wherein said first power signal line is connected to said means for engaging and disengaging the braking means via a first power switching device and said second power signal line is connected to the means for engaging and disengaging the braking means via a second power switching device.

In some examples, in use, the first and second power signal lines provide power to the means for engaging and disengaging said braking means such that said braking means remains disengaged.

In some examples, in use, if either or both of the first and second power signal lines do not provide power to the means for engaging and disengaging the braking means, the brake is engaged.

In some examples, said means for engaging and disengaging said braking means may comprise a solenoid.

In some examples, the first power signal line may be a low voltage power line.

In some examples, the first power line may be configured to receive a signal from an electronic control unit (ECU).

In some examples, the second power signal line may be a low voltage power line.

In some examples, the second power line may be configured to receive a signal from an alternative system monitoring system. In some examples, the alternative system monitoring system may be an over travel detection system.

In some examples, the first and second power signal lines may function independently of each other.

In some examples, the first and second power signal lines may be independently connected to the means for engaging and disengaging the braking means.

In some examples, the first and/or second power switching device may comprises a device that uses the low power signal to activate a higher power source sufficient to drive the "solenoid": Such examples of devices are MOSFET switches, Relays (mechanical or stolid state) etc.

The braking units described herein may be used in a high lift actuation system for an aircraft. They may alternatively be used in other systems.

DETAILED DESCRIPTION

In known high-lift systems for aircraft (or other systems that require a similar function) a stopping device may be required at a location that is remote from the main power system. These are usually called outboard brake (OBB) wing tip brakes The OBB is controlled directly with actual power to remove (or apply) the brake; however a typical system may need an independent device to stop the system.

In the new examples of braking units as described herein, instead of the drive switch for powering the brake being remote from the braking unit, for example, in the ECU of the aircraft, the switch is built into the actual brake unit itself.

An additional drive switch for powering the brake is also inbuilt into the braking unit to receive a signal that can counter the signal from the ECU in case of failure. In some examples the additional drive switch can be monitored by an independent device (such as determining if over travel has occurred).

The main power to the brake is fed from a power line. The types of switches used can be of various types and any electronics making up the switches may also be included in the brake.

The examples described herein now be described in greater detail with reference to the figures.

Figure 1:
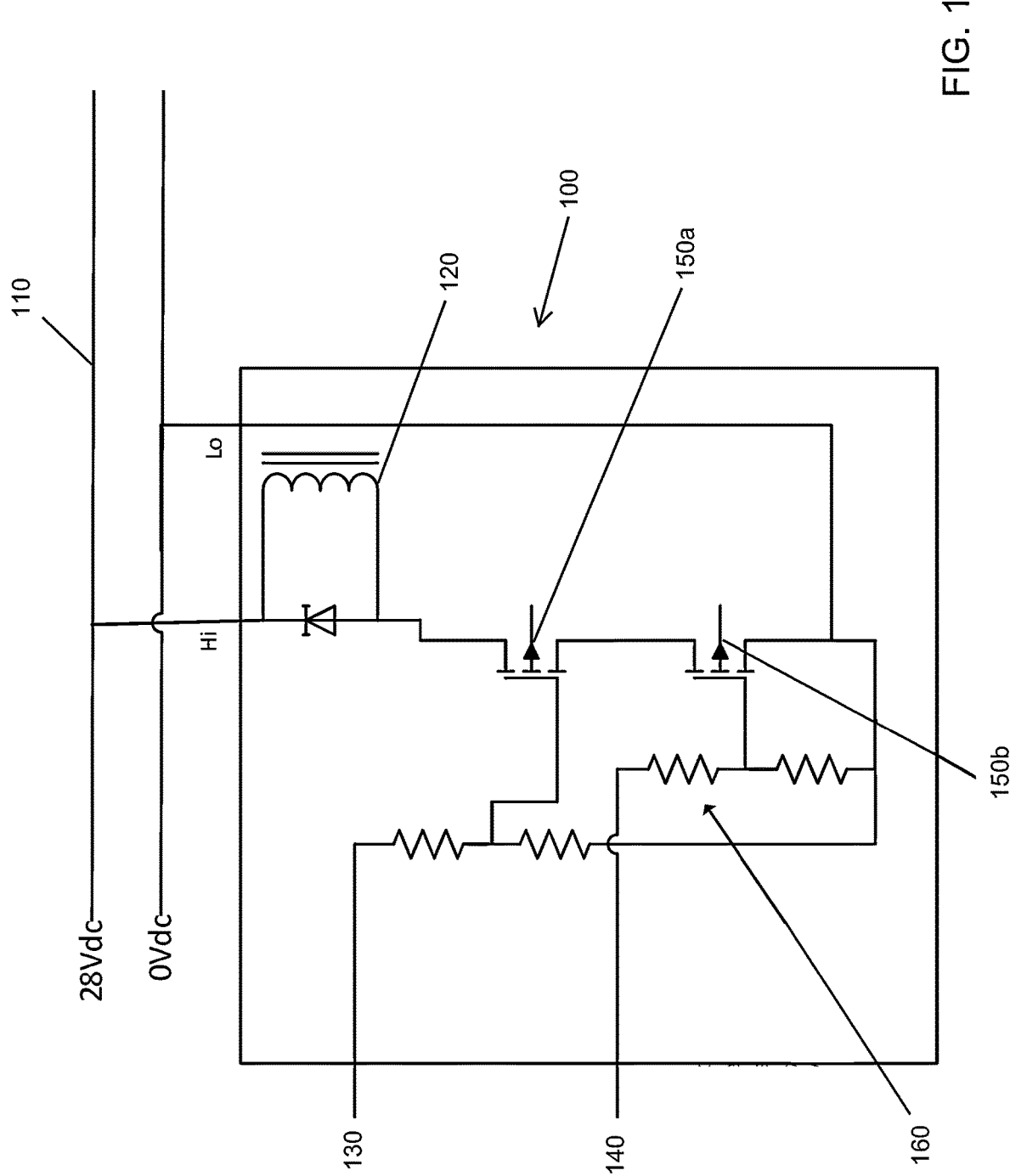
FIG. 1 shows a circuit diagram of the electronics of a first example of a new type of brake control unit wherein a MOSFET type device is used.

FIG. 1 depicts a new type of braking unit 100. A main power line 110 provides power to the braking unit 100. The main power line 110 is electronically connected to a solenoid 120. When power is supplied to the solenoid 120 such that it is activated, the brake is disengaged. When the circuit is broken, or no power is supplied to the solenoid 120, then the solenoid 120 is deactivated and the brake is engaged.

As can be seen in FIG. 1, a first power signal line 130 is applied to the solenoid 120 in use. This may be a low voltage power signal line. For example, in some examples, the voltage may be in the region of 0-50V, although the examples described herein are not limited to this, This power signal line may come, for example, from the ECU. A second power signal line 140 is also applied to the solenoid 120 in use. This may also be a low voltage power signal line. In some examples, the second power signal line 140 may be provided by an independent system monitoring.

Further power signal lines may also be added to the braking unit, as required and the examples are not limited to having only two of these power lines 130, 140. The first and second power signal lines 130, 140, function independently of each other. Each of these are also independently connected to the solenoid 120 via a power switching device 150a,b. That is, the first power signal line 130 is connected to the solenoid 120 via a first power switching device 150a and the second power signal line 140 is connected to the solenoid 120 via a second power switching device 150b. In the example shown in FIG. 1 the power switching devices 150a,b, are MOSFET devices, however, other types of devices as are known in the art, e.g. relays, may be used. The device uses the low power signal to activate a higher power source sufficient to drive the "solenoid". Other examples of these may include Relays (mechanical or stolid state) etc.

As can be seen in FIG. 1, resistors 160 may be used in the circuitry of the braking unit 100, in this case, to reduce the 28V DC signal down to a suitable level for the MOSFET switches 150a,b other suitable electrical/electronics to provide this type of functionality may be used.

In use, the first and second power signal lines 130, 140 provide signal to the switching device to power the solenoid 120 such that the brake remains disengaged.

The braking unit 100 is configured such that if no power is provided via either the first or second power signal line 130, 140, the MOSFET switches open and power is no longer provided to the solenoid 120 so that the brake is therefore engaged. Alternatively the signal lines could be set up to disengage the brake dependant on need.

The benefit of this is that the braking unit 100 therefore has two means for being independently activated and controlled. In addition to this, the ECU also does not have to produce a high current supply to the solenoid 120, but only has to provide a low voltage signal line. The main power of the brake could be fed from a backbone supply 110 that may be for example a high voltage supply.

Figure 2:
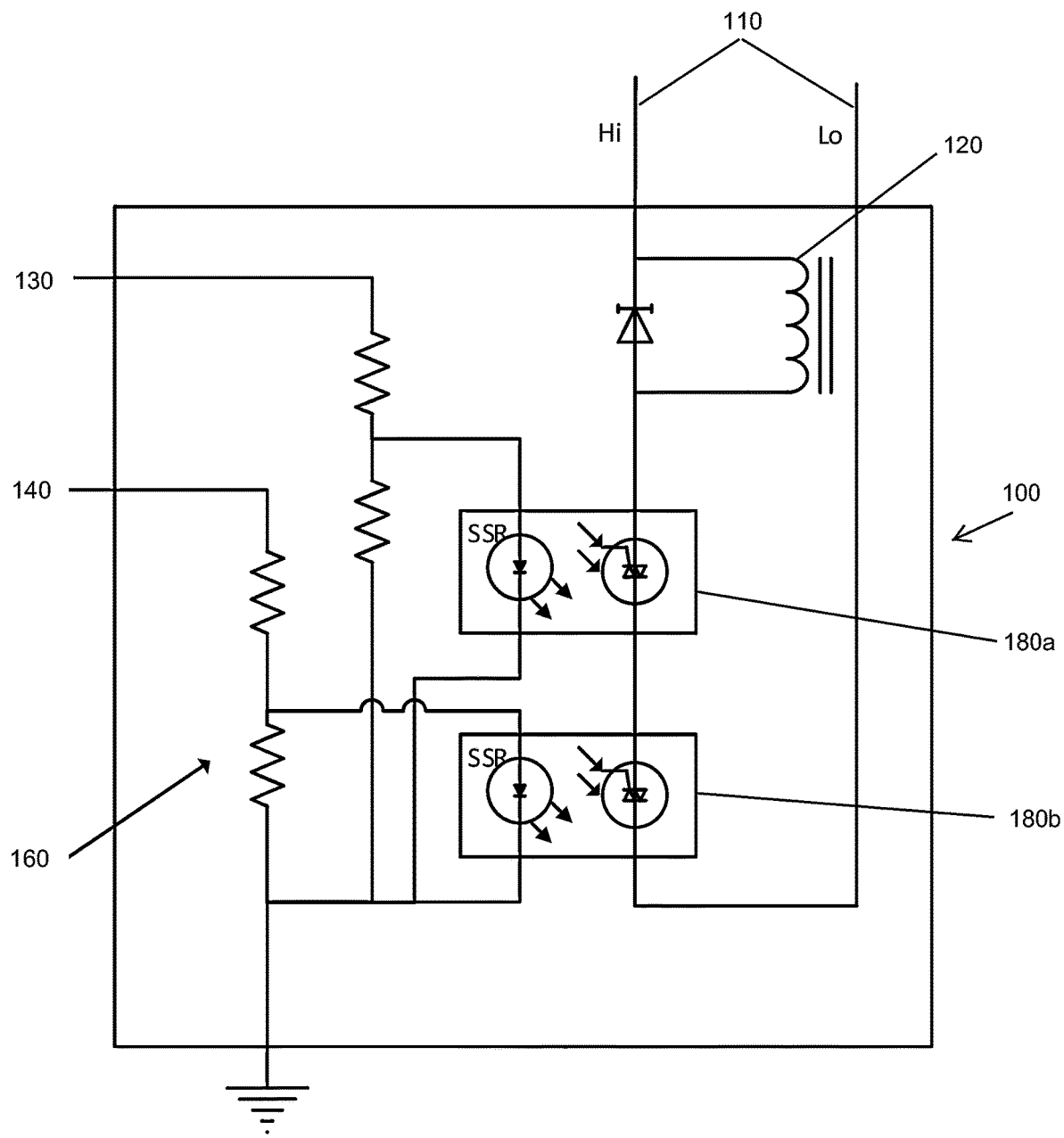
FIG. 2 shows a circuit diagram of the electronics of a second example of a new type of brake control unit wherein a Solid State Relay (SSR) type device is used.

A second example of a new type of braking unit is shown in FIG. 2. This example is similar to the example shown in FIG. 1 and described above and the same reference numerals represent the same features in FIG. 2 as in FIG. 1. In this example, however, the power switching devices 180a, 180b are SSR's. Again, any other type of power switching device may be used that will allow current to pass through.

The examples provided and described herein add functionality into the brake control unit. Such brake control units can be incorporated into leading edge/slat systems of aircraft. The new braking units described herein can also be incorporated into systems other than high lift systems for aircraft and the examples are not limited to this. The braking unit described herein provides a remote brake/stopping device that allows the brake to remotely be engaged/disengaged by either the system that is controlling it, or an independent device (such as a device measuring the travel or movement of the system).

The invention claimed is:

1. A braking unit comprising
   a brake;
   means, configured to receive power from a power line, for engaging and disengaging said brake;
   a first power signal line connected to said means for engaging and disengaging said brake;
   a second power signal line connected to said means for engaging and disengaging brake; and
   wherein said first power signal line is connected to said means for engaging and disengaging the brake via a first power switching device and said second power signal line is connected to the means for engaging and disengaging the brake via a second power switching device.

2. The braking unit of claim 1 wherein, in use, the first and second power signal lines provide power to the means for engaging and disengaging said brake such that said brake remains disengaged.

3. The braking unit of claim 1 wherein, in use, if either or both of the first and second power signal lines do not provide power to the means for engaging and disengaging the brake, the brake is engaged.

4. The braking unit of claim 1, wherein said means for engaging and disengaging said brake comprises a solenoid.

5. The braking unit of claim 1, wherein said first power signal line is a low voltage power line.

6. The braking unit of claim 1, wherein said first power line is configured to receive a signal from a System electronic control unit "ECU".

7. The braking unit of claim 1, wherein said second power signal line is a low voltage power line.

8. The braking unit of claim 1, wherein said second power line is configured to receive a signal from an over travel detection system.

9. The braking unit of claim 1, wherein said first and second power signal lines, function independently of each other.

10. The braking unit of claim 1, wherein said first and second power signal lines are independently connected to the means for engaging and disengaging the brake.

11. The braking unit of claim 1, wherein said first and/or second power switching device comprises an electrical, electro mechanical or electronic device.

12. The braking unit of claim 1 wherein the first and/or second power switching device is a MOSFET device.

13. The braking unit of claim 1, wherein said first or second power switching device comprises a solid state relay "SSR" device.

14. A high lift actuation system for an aircraft comprising: the braking unit of claim 1.

* * * * *